United States Patent [19]
> Lawrenson

[11] 3,790,361
[45] Feb. 5, 1974

[54] MANUFACTURE OF FLAT GLASS
[75] Inventor: Jack Lawrenson, St. Helens, England
[73] Assignee: Pilkington Brothers Limited, Liverpool, Lancashire, England
[22] Filed: Sept. 22, 1971
[21] Appl. No.: 182,770

[30] Foreign Application Priority Data
Sept. 23, 1970  Great Britain.................... 45363/70

[52] U.S. Cl. ............................... 65/99 A, 65/182 R
[51] Int. Cl............................................. C03b 18/00
[58] Field of Search............... 65/99 A, 182 R, 65 A

[56] References Cited
UNITED STATES PATENTS
3,558,295  1/1971  Bezombes et al............... 65/99 A X
3,607,203  9/1971  Fujimoto et al. ................ 65/99 A X
3,607,199  9/1971  Itakura............................. 65/99 A X
3,655,356  4/1972  Javaux .............................. 65/182 R
3,356,478  12/1967  Galey................................. 65/99 A
3,459,523  7/1969  Atkeson............................. 65/99 A FOREIGN PATENTS OR APPLICATIONS
1,323,711  4/1963  France.............................. 65/65 A Primary Examiner—Robert L. Lindsay, Jr.
Assistant Examiner—Kenneth M. Schor
Attorney, Agent, or Firm—Peter H. Smolka et al.

[57] ABSTRACT

In the float process for the manufacture of flat glass in ribbon form on a bath of molten metal, the movement of the ribbon along the bath surface creates a forward flow of molten metal in a surface layer of the bath, which forward flow is segregated by flow dividing means for an upstream return flow of cooler molten metal along the bottom of the bath.

14 Claims, 8 Drawing Figures

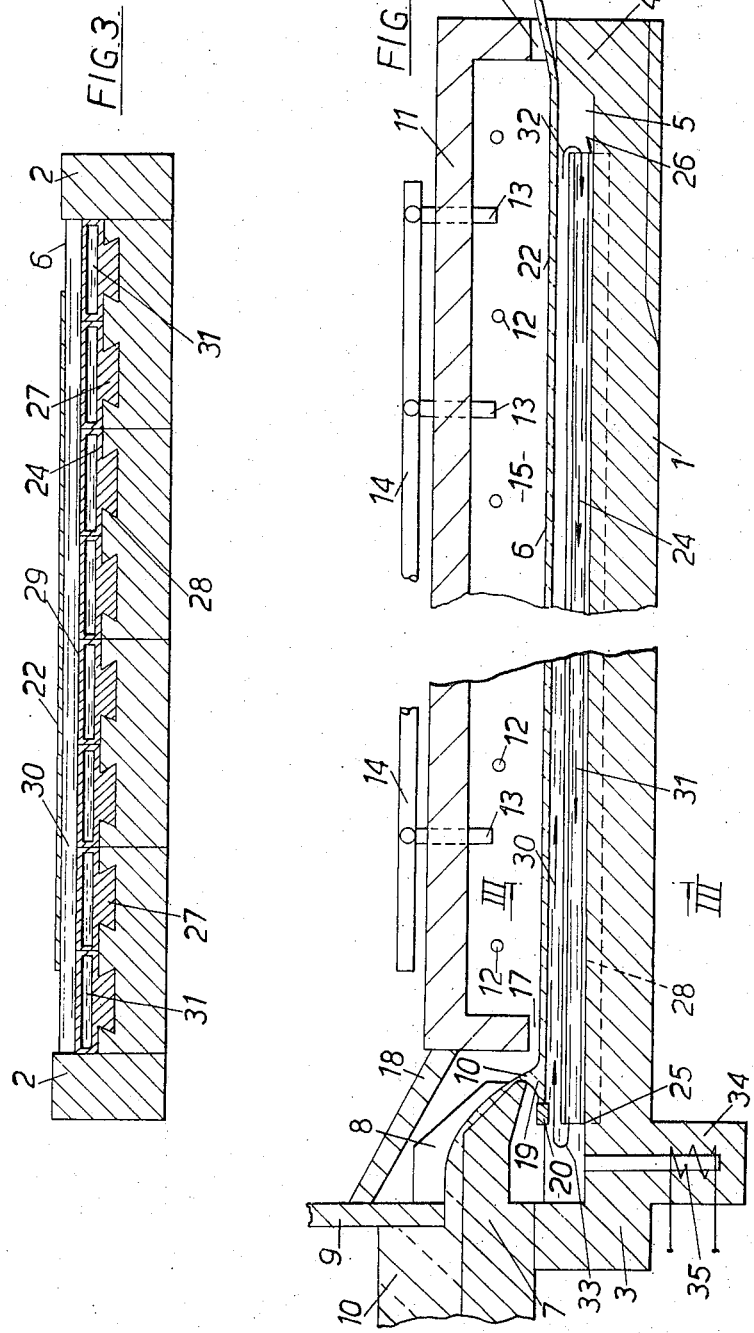

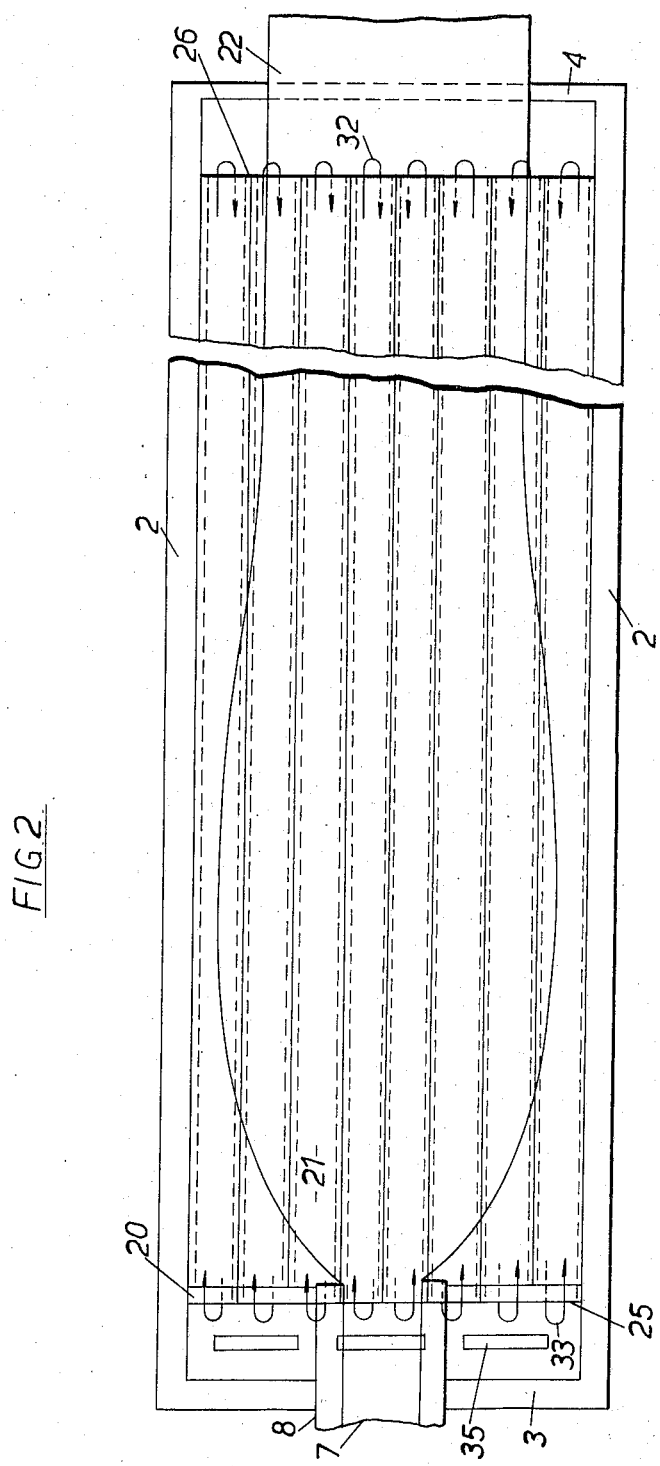

PATENTED FEB 5 1974 3,790,361

MANUFACTURE OF FLAT GLASS

BACKGROUND OF THE INVENTION

1. Field of the Invention

This invention relates to the manufacture of flat glass and more particularly to the manufacture of flat glass by the float process in which a ribbon of glass is advanced along a bath of molten metal.

As the ribbon advances along the bath at a speed which is determined by the speed at which the ribbon is taken from the bath, the ribbon draws with it a forward flow of molten metal in the surface layer of the bath.

2. Description of the Prior Art

In methods of operating the float process for the production of thinner float glass, for example down to 2 mm thick, the ultimate ribbon of thin float glass produced is discharged from the bath at high speed, for example up to 1,200 metres per hour. The molten glass poured on to the bath spreads as a layer on the bath surface and the layer of glass is advanced in ribbon form along the bath at a speed for example of about 150 metres/hour. Acceleration of the glass as it is attenuated means a gradual increase in the forward flow of molten metal which is drawn by the glass along the bath. The existence of this forward flow necessarily means a return flow of cooler molten metal along the bottom of the bath and when working at the higher speeds now being employed for the manufacture of thin float glass it has been found that mixing of the forward and return flows results in thermal inhomogeneities tending to cause distortion in the ribbon of glass.

It is a main object of the present invention to provide a method and apparatus for the manufacture of float glass in which the forward flow of molten metal can be separately controlled independently of the return flow and the production of distortion due to thermal inhomogeneity in the forward flow is avoided.

SUMMARY

A ribbon of float glass is advanced along an elongated bath of molten metal and is cooled as it is advanced for discharge from one end of the bath at a predetermined velocity. The forward flow of molten metal in a surface layer of the bath, engendered by the advancing ribbon, is segregated in a region of the bath from a return flow of molten metal along the bottom of the bath in that region.

BRIEF DESCRIPTION OF THE DRAWINGS

FIG. 1 is a sectional elevation of apparatus according to the invention including a tank structure containing a bath of molten metal and a roof structure for the tank structure with a false floor in the tank structure, FIG. 2 is a plan view of the tank structure of the apparatus of FIG. 1 with the roof removed, FIG. 3 is a section on line 3—3 of FIG. 1.

DESCRIPTION OF THE PREFERRED EMBODIMENTS

Figure 4:
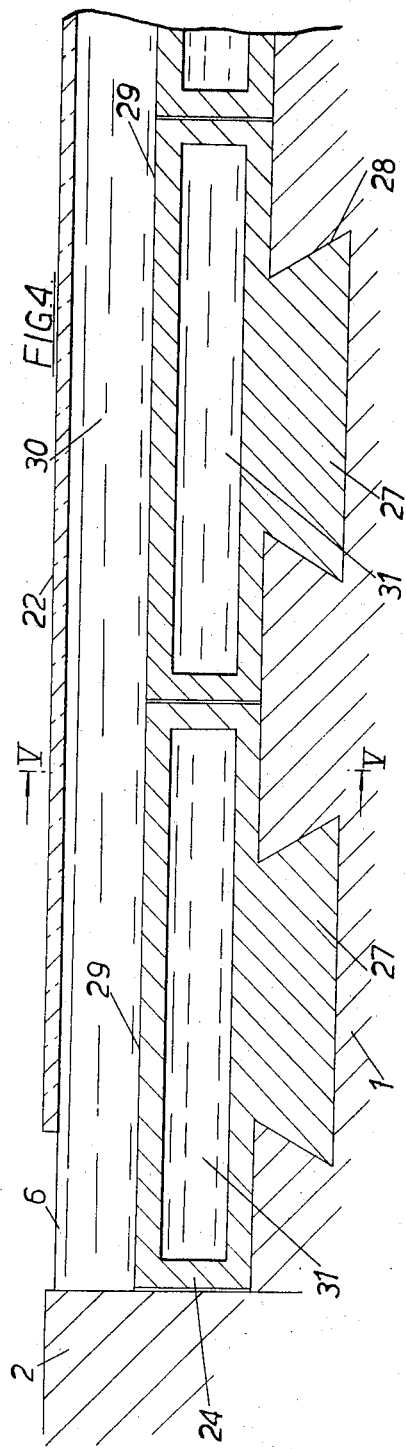
FIG. 4 is an enlarged view of part of the section of FIG. 3 showing the false floor to the bath in greater detail.

Referring to FIGS. 1 to 3 of the drawings apparatus for use in carrying out the float process for the manufacture of flat glass in ribbon form comprises a tank structure having a floor 1, side walls 2 and end walls 3 and 4 respectively at the inlet and outlet ends of the tank structure.

An elongated tank structure which is formed of refractory blocks contains a bath 5 of molten metal whose surface is indicated at 6. A spout 7 of generally rectangular cross section and having side jambs 8 and an associated tweel 9, extends over the inlet end wall 3 of the tank structure. The flow of molten glass 10 over the spout 7 on to the surface 6 of the molten metal bath is regulated by the tweel 9.

A roof structure 11 extends over the tank structure in known manner and is provided with heaters 12 to regulate the temperature of the glass and with ducts 13 connected to headers 14 through which a protective atmosphere is supplied into the headspace 15 defined by the roof structure over the bath. The flow of protective atmosphere into the headspace 15 is at a rate to maintain the protective atmosphere at a plenum in the headspace so that there is outward flow of protective gas through the outlet 16 from the bath defined above the end wall 4 of the tank structure and through the inlet 17 beneath the roof structure through which the layer of molten glass flows on the bath surface.

A cover 18 is secured over the spout to enclose the spout between the tweel 9 and the roof structure 11.

The molten glass which is poured on to the bath surface from the spout 7 is indicated at 10. There is a flow of molten glass beneath the spout to form a heel 19 which touches a wet-back tile 20 mounted across the tank structure and spaced from the inlet end wall 3. This wet-back tile lies just in the surface 6 of the molten metal bath.

The molten glass 10 spreads laterally on the bath surface as indicated at 21 in FIG. 2 and the layer 21 is advanced in ribbon form under the influence of traction applied to the ultimate ribbon of glass 22 which is produced by conveyor rolls 23, one of which is shown, which rolls lift the ribbon of glass 22 from the bath surface 6 for discharge through the outlet from the bath on to the rolls 23.

In the embodiment illustrated the traction is such that there is some decrease in width and thickness of the ribbon of glass due to attenuation after unhindered lateral flow has taken place and in order to regulate the ribbon thickness.

The layer of molten glass 21 is advancing along the bath at a rate of about 150 metres per hour and the ultimate ribbon of glass, for example 5 mm thick, is taken from the bath at about 375 metres per hour. The forward velocity of the layer 21 carries with the advancing glass a forward flow of molten metal in a surface layer of the bath. This forward flow exists right along the bath and the volume rate of flow in the forward flow increases as the velocity of the glass increases. In order to replenish the forward flow there is a return flow of cooler molten metal along the bottom of the bath from the region of the outlet end wall 4 where the temperature is of the order of 650° to 700°C up to the hot inlet end region where the temperature is about 1,000°C.

The invention segregates the forward flow from the return flow and provides for regulation both of the depth and temperature of the forward flow in a manner commensurate with the speed of advance of the ribbon of glass.

To this end flow dividing means is provided in the tank structure spaced from the floor of the tank structure at a height for channelling upstream flow of molten metal along the bottom of the tank below the forward molten metal flow with the ribbon of glass.

Figure 5:
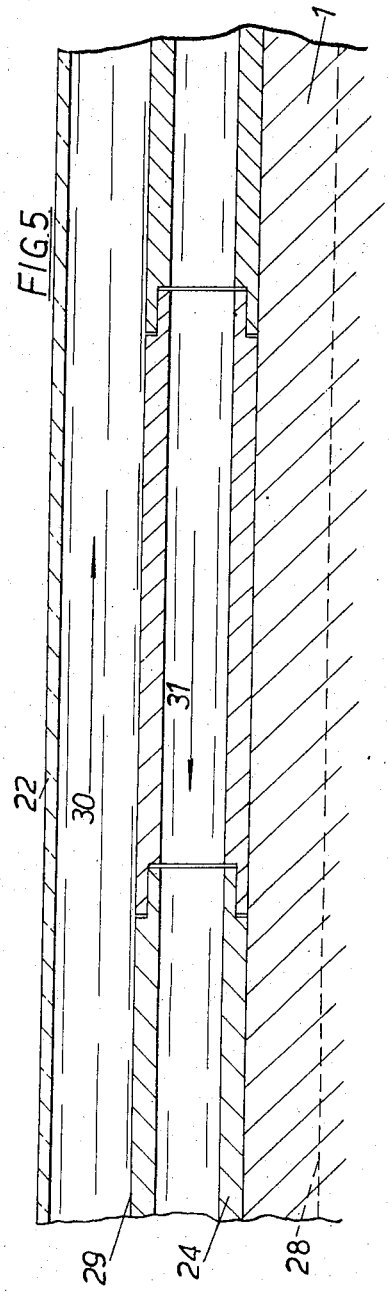
FIG. 5 is a section on line 5—5 of FIG. 4.

In the embodiment of FIGS. 1 to 3 which is illustrated in greater detail in FIGS. 4 and 5 the flow dividing means is provided by a plurality of hollow channel members 24 of rectangular cross section which are secured side-by-side to the floor of the tank structure. The channel members 24 extend along substantially the whole length of the tank structure so that the end 25 of the false floor at the inlet end of the bath is spaced from the inlet end wall 3 and lies just below the wet-back tile 20. The end 26 of the false floor at the outlet end of the bath is spaced from the end wall 4 and this spacing at both ends is sufficient to permit circulation of molten metal between the forward and return flows.

Each of the hollow channel members 24 is formed with a downwardly projecting dove-tail tongue 27 on its lower face and the tongues 27 fit into corresponding grooves 28 formed in the refractory blocks of the floor 1 of the tank structure. In this way the channel members 24 are secured to the floor of the tank structure side-by-side and extending from one side wall of the tank structure to the other. The abutting top surfaces 29 of the channel members from the false floor of the tank structure above which the forward flow 30 of molten metal takes place with the ribbon of glass and below which the return flow 31 is channelled through the channel members.

There is circulation of molten metal from the forward flow 30 into the channels through the members 24 at the outlet end of the bath as indicated by the arrow 32. At the inlet end of the bath there is a similar circulation from the return flow 31 into the forward flow 30 as indicated by the arrow 33. Throughout the upstream flow of the molten metal 31 through the channel members 24 the molten metal is being gradually heated from the temperature of the outlet end, e.g., 650°C up to the inlet end temperature, e.g. 1,000°C, by conduction through the false floor of heat from the forward flow.

Mounted in a sump 34 in the floor of the tank structure beneath the spout 7 are a series of inductors indicated at 35 which provide an upward pumping of hot molten metal to ensure that the molten metal temperature at the hot end of the bath is of the same order as the temperature of the glass arriving on the bath. The upward pumping by the inductors also assists the direction of the upstream flow 31 into the forward flow 30 through the entrance to the forward flow existing between the bottom of the wet-back tile 20 and the upstream end of the false floor 29.

Preferably the channel members 24 are made of carbon so that there is good thermal exchange ensuring that the molten metal pumped into the forward flow at the same temperature as the molten glass 10 arriving on the bath. The forward flow 30 thus takes place over a carbon false floor 29. The forward flow 30 is relatively shallow but is of sufficient depth to float the ribbon and provide the molten metal which is carried along the bath but the depth is not so great as to produce a return flow of molten metal above the false floor 29. The molten metal in the forward flow 30 is subject to the same longitudinal temperature gradient as the glass and the probability of thermal inhomogeneity existing in the forward flow is substantially avoided.

The carbon channel members 24 are made up in sections which interlock as illustrated in FIG. 5. The interlocking is such as to avoid uncontrolled leaks of molten metal between the two flows.

Figure 6:
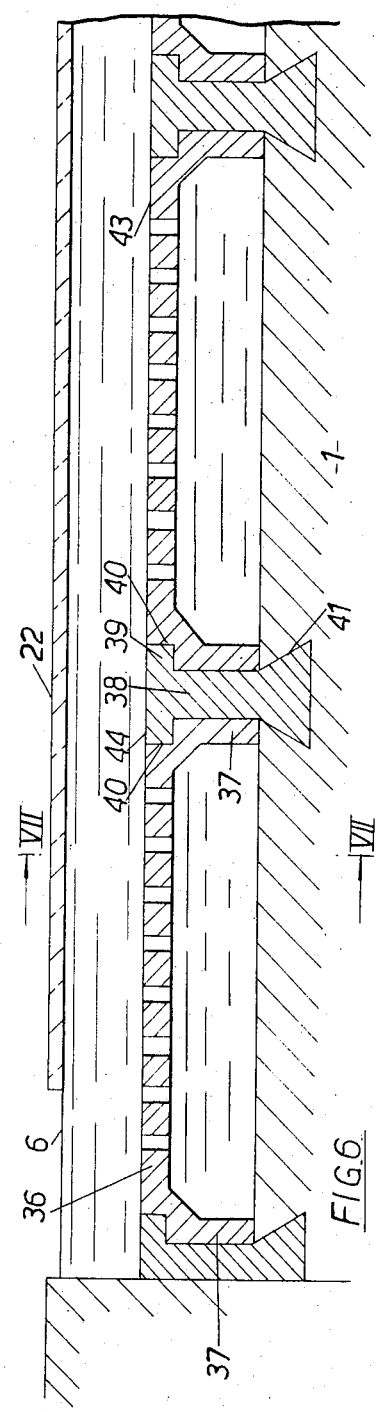
FIG. 6 is a section similar to FIG. 4 illustrating another form of embodiment in which the false floor is perforated.
Figure 7:
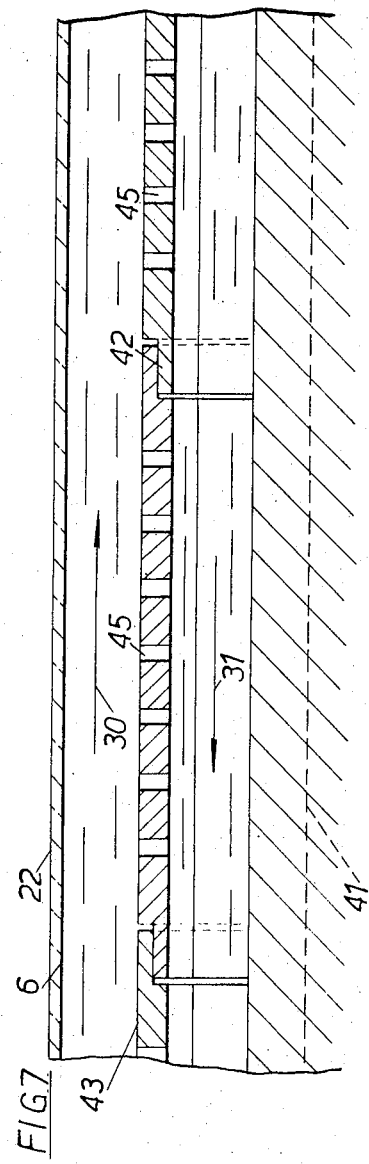
FIG. 7 is a section on line 7—7 of FIG. 6.

In the embodiment of FIGS. 6 and 7 the false floor is constituted by a plurality of elongated members 36 of U-section which are inverted and secured side-by-side to the floor 1 of the tank structure. The legs 37 of each of the members 36 rest on the floor of the tank structure and the members 36 are secured to the floor by key members 38 each having a head 39 which engages into rebates 40 formed in the shoulders of the members 36. The bottom of each key member 38 is formed as a dove-tail which is slid into a corresponding groove 41 in the floor of the tank structure. The members 36 are in short sections as shown in FIG. 7 which interlock into each other to form sealed joints 42. The upper faces 43 of the members 36 provide, together with the top surface 44 of the heads of the keys 38, the false floor of the tank structure and beneath the false floor there are a plurality of parallel channels for the upstream flow 31 of molten metal. The members 36 are made of carbon whose good thermal conductivity ensures heat exchange between the forward and return flows. The inverted bases of the U-section members 36 are perforated by a series of holes 45 distributed over the members 36. These holes 45 permit regulated infiltration of molten metal from the return flow into the forward flow. Because of the carbon dividing means separating the return flow from the forward flow there is a measure of thermal equilibrium between the two flows at any location along the bath and interchange of molten metal from the return flow 31 to the forward flow 30 does not result in disturbance of the thermal state of the forward flow. In this way when the glass is accelerating and the forward flow of molten metal drawn along with the glass is also accelerating, the forward flow can replenish itself by drawing molten metal from the return flow through the holes 45 and the possibility of distortion being introduced into the underface of the glass by a forward flow of molten metal insufficient to match the acceleration of the glass ribbon is avoided.

The false floor may be perforated only over that section of the bath where the glass is being accelerated or if desired, may be perforated over the whole length of the false floor of the tank structure.

Figure 8:
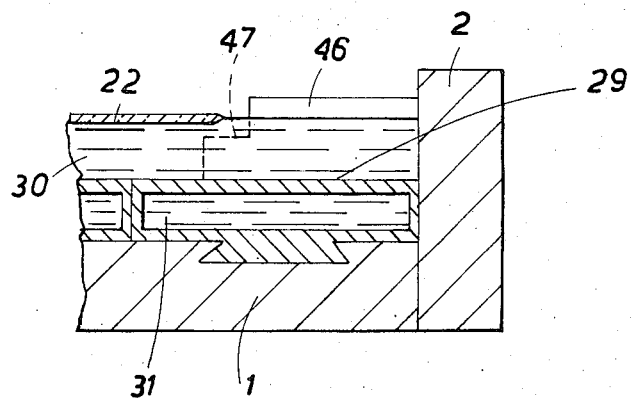
FIG. 8 is a sectional detailed view illustrating transverse baffles at the sides of the tank structure.

FIG. 8 illustrates a modification of the apparatus of FIGS. 1 to 5, which may be employed to inhibit flow of cooler molten metal upstream in the surface layer of the molten metal exposed at the sides of the ribbon of glass. A series of transverse baffles 46, one of which is illustrated, extend inwardly from the side walls 2 of the tank structure and are seated on the top surface 29 of the outermost channel member at both sides of the tank and are spaced apart along the tank. Each baffle 46 extends through the whole depth of the bath above the false floor at the side of the ribbon of glass 22, and is cut away, as indicated at 47, at its inner top corner to avoid any possibility of obstruction to the advance of the ribbon.

The primary function of the baffles is to inhibit return flows of molten metal at the sides of the ribbon above the false floor, and thereby strengthen the return flow 31 beneath the false floor.

The baffles may be employed in the same way with the embodiment of FIGS. 6 and 7.

The provision of the false floor, either with or without the transverse side baffles, thus provides improved support for an advancing ribbon of glass in the float process and constitutes yet another improvement in adapting the process to the manufacture of thinner glass, for example down to 2 mm thick and below and is particularly effective as the speed of the ribbon increases, for example up to 1,200 metres per hour when manufacturing glass 2 mm thick.

I claim:

1. A method of manufacturing float glass comprising:

advancing a ribbon of glass along an elongated bath of molten metal contained in an elongated tank structure, cooling the ribbon as it is advanced for discharge from one end of the bath at a predetermined velocity thereby creating a forward flow of molten metal in a surface layer of the bath, and physically segregating, in a region of the bath contained within said tank structure, said forward flow of molten metal from a return flow of molten metal along the bottom of said region of the bath.

2. A method according to claim 1, wherein said region extends along substantially the whole length of the path of travel of the ribbon of glass along the bath.

3. A method according to claim 1, including inhibiting molten metal flow in the surface layer of the molten metal bath exposed at the sides of the ribbon of glass.

4. A method of manufacturing float glass comprising:

advancing a ribbon of glass along an elongated bath of molten metal contained in an elongated tank structure, cooling the ribbon as it is advanced for discharge from one end of the bath at a predetermined velocity thereby creating a forward flow of molten metal in a surface layer of the bath, segretating, in a region of the bath contained within said tank structure, said forward flow of molten metal from a return flow of molten metal along the bottom of said region of the bath, and permitting regulated infiltration of molten metal from the return flow into the forward flow in said region of the bath.

5. A method according to claim 4, comprising:
   accelerating the glass during its advance through said region, and regulating said infiltration to increase the volume rate of flow of molten metal in said forward flow at a rate determined by the acceleration of the glass.

6. Apparatus for use in the manufacture of float glass comprising:

an elongated tank structure containing a bath of molten metal, means for delivering glass at a controlled rate to one end of the bath and advancing the glass in ribbon form along the bath, means for cooling the glass as it is advanced for discharge from the other end of the bath, and flow dividing means spaced from the floor of the tank structure at a height to define a channel means for establishing an upstream flow of molten metal below forward molten metal flow over the dividing means.

7. Apparatus according to claim 6, wherein said flow dividing means is constituted by a false floor in the tank structure spaced from the floor of the tank structure and extending from one side wall of the tank structure to the other.

8. Apparatus according to claim 7, including a plurality of hollow channel members of rectangular cross section secured side-by-side to the floor of the tank structure, to provide a plurality of parallel channels comprising said channel means for establishing the upstream flow of molten metal, the abutting top surfaces of the channel members forming the false floor.

9. Apparatus according to claim 7, including a plurality of elongated members of U-section which are inverted and secured side-by-side to the floor of the tank structure providing a plurality of parallel channels comprising said channel means for establishing the upstream flow of molten metal beneath said false floor constituted by the inverted bases of the U-section members.

10. Apparatus according to claim 7, wherein the false floor is perforated to permit regulated infiltration of molten metal from the return flow into the forward flow.

11. Apparatus according to claim 6, including transverse baffles extending inwardly from the tank structure above the flow dividing means alongside the path of travel of the glass to inhibit upstream flows of molten metal along the sides of the bath surface.

12. A method of manufacturing float glass comprising:

advancing a ribbon of glass along an elongated bath of molten metal contained in a tank, cooling the ribbon as it is advanced for discharge from one end of the bath at a predetermined velocity thereby creating a forward flow of molten metal in a surface layer of the bath, physically segregating, in a region of the bath contained within said tank, said forward flow of molten metal from a return flow of molten metal along the bottom of said region of the bath, and maintaining the depth of the forward flow of molten metal in said region of the bath at a value which provides a volume rate of flow in the forward flow commensurate with the speed of advance of the ribbon along the surface of said region of the bath.

13. Apparatus for use in the manufacture of float glass comprising:

an elongated tank structure containing a bath of molten metal, means for delivering glass at a controlled rate to one end of the bath and advancing the glass in ribbon form along the bath, means for cooling the glass as it is advanced for discharge from the other end of the bath, and a false floor in the tank structure extending along substantially the whole length of the tank structure, said false floor being spaced from the floor of the tank structure at a height to define channel means for establishing an upstream flow of molten metal below forward molten metal flow over the flase floor, and the ends of said false floor being spaced from the end walls of the tank structure by a distance at each end of the bath permitting circulation of molten metal between the forward and return flows.

14. In a method of manufacturing float glass wherein a ribbon of glass is advanced along an elongated bath of molten metal contained in an elongate tank structure, the ribbon is cooled as it is advanced for discharge from one end of the bath, a forward flow of molten metal is created in a surface layer of the bath, and a return flow of molten metal is generated in the tank structure beneath the forward flow, the improvement comprising:

physically segregating, in a region of the bath contained within said tank structure, said forward flow of molten metal from said return flow of molten metal along the bottom of said region of the bath so as to enhance thermal homogeneity in said forward flow.

* * * * *